(12) United States Patent
Wu

(10) Patent No.: US 9,948,308 B2
(45) Date of Patent: Apr. 17, 2018

(54) MULTI-MODULUS PRESCALER WITH IMPROVED NOISE PERFORMANCE

(71) Applicant: Peregrine Semiconductor Corporation, San Diego, CA (US)

(72) Inventor: Gary Chunshien Wu, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 14/673,489

(22) Filed: Mar. 30, 2015

(65) Prior Publication Data
US 2016/0294395 A1 Oct. 6, 2016

(51) Int. Cl.
*H03K 21/00* (2006.01)
*G06F 17/50* (2006.01)

(52) U.S. Cl.
CPC ......... *H03K 21/00* (2013.01); *G06F 17/5077* (2013.01)

(58) Field of Classification Search
CPC ...... H03L 7/1972; H03L 7/1974; H03L 7/091
USPC ............... 327/146–162; 375/371, 373, 375; 377/47, 48, 117
See application file for complete search history.

(56) References Cited

U.S. PATENT DOCUMENTS

| | | | | |
|---|---|---|---|---|
| 5,504,756 A * | 4/1996 | Kim | ............... | G01R 31/31926 324/73.1 |
| 6,614,870 B1 * | 9/2003 | Miller | ............... | H03K 23/667 377/48 |
| 6,661,271 B1 * | 12/2003 | Burdick | ............... | H03K 5/1504 327/170 |
| 6,968,092 B1 * | 11/2005 | Winger | ............... | G06T 9/008 375/240.22 |
| 7,248,665 B2 * | 7/2007 | Shi | ............... | H03K 23/667 327/115 |
| 7,573,305 B1 * | 8/2009 | Cosand | ............... | H03K 23/542 327/113 |
| 7,675,443 B1 * | 3/2010 | Ozgur | ............... | H03M 3/362 341/138 |

OTHER PUBLICATIONS

Analog Devices, "Fundamental Phase Locked Loop Architecture", MT-086 Tutorial, Rev. 0, Oct. 2008, WK, 10 pgs.

(Continued)

*Primary Examiner* — Dinh T Le
(74) *Attorney, Agent, or Firm* — Jaquez Land Greenhaus LLP; Martin J. Jaquez, Esq.; John Land, Esq.

(57) ABSTRACT

Design techniques for multi-modulus prescaler circuits that minimize the input-to-output delay dependence on the modulus control state or history. The feed-forward signal path inside a multi-modulus prescaler is identified, as well as all feedback paths connected to the feed-forward signal path. In various embodiments, one or more of several techniques may be applied to reduce capacitive load variations and signal coupling due to the modulus control state or history. For at least one component coupled to the feed-forward signal path and having a feedback path, a buffered feedback path may be created separate but parallel to a buffered feed-forward signal path. Double buffers may be added to some feedback paths directly coupled to the feed-forward path so that the forward signal path is not affected by load variations in such feedback paths.

17 Claims, 3 Drawing Sheets

(56) References Cited

OTHER PUBLICATIONS

Rhee, et al., "Fractional-N Frequency Synthesis: Overview and Practical Aspects with FIR-Embedded Design", Journal of Semiconductor Technology and Science, vol. 13, No. 2, Apr. 2013, pp. 170-183.

Hillman, Dan, "Inherent Benefits of a Delta-Sigma Fractional-N PLL in Power-Conscious SOC Designs", Chip Design—Tools, Technologies & Methodologies, Feb. 20, 2007, 10 pgs.

* cited by examiner

US 9,948,308 B2

MULTI-MODULUS PRESCALER WITH IMPROVED NOISE PERFORMANCE

BACKGROUND

(1) Technical Field

This invention generally relates to electronic circuitry, and more specifically to multi-modulus prescaler electronic circuits suitable for use in phase locked loops and frequency synthesizers.

(2) Background

A phase locked loop (PLL) is an electronic feedback control system that generates an output frequency Fout having a phase that is related to the phase of an input reference frequency Fref. A typical PLL compares the phases of two input frequencies, Fc and Fp, in a phase detector, which produces an error signal e(s) that is proportional to the difference between the phases of the input frequencies. The error signal is then loop filtered and used to drive a variable frequency oscillator, typically a voltage controlled oscillator (VCO), which creates the output frequency Fout. The output frequency Fout is fed through a feedback divider (an "N counter") back to the input of the system as Fp, producing a negative feedback loop; the feedback divider generally includes a prescaler circuit to count a fixed number of output cycles so as to generate output pulses at a rate more conveniently handled by programmable counting circuitry. If the output frequency Fout drifts, the phase error signal e(s) will increase, driving the output frequency Fout in the opposite direction so as to reduce the error. The other input frequency, Fc, is derived by dividing down a reference frequency Fref, usually derived from a very stable frequency source, such as a crystal oscillator.

PLLs have numerous applications in the field of electronics, including as frequency synthesizers in radio systems.

It is desirable in many applications, and especially in radio frequency (RF) based applications, that the noise levels of a PLL be low. In particular, it is desirable to reduce phase noise, a well-known characteristic of oscillator-based circuits. The present invention addresses these needs.

SUMMARY OF THE INVENTION

In a dual modulus prescaler suitable for use with a fractional-N phase locked loop (PLL) system, the dual modulus prescaler divides an input frequency Fin by P or P+1 (e.g., 5 or 6, or 10 or 11), depending on the Modulus_Select control signal that selects the divisor. A dual modulus prescaler functions within a PLL by working in conjunction with lower speed digital counters to achieve a total frequency division N, where N has a minimum step of one. In a MASH 1-1-1 third order delta-sigma modulator (DSM) based fractional-N PLL, the value of N can vary from cycle to cycle from N−3 to N+4 in a somewhat random fashion. During the division process, the Modulus_Select control input to the dual modulus prescaler also toggles some-what randomly. The result is that the modulus control logic in a dual modulus prescaler causes signal delay variations in the critical forward signal path. We have found that it is critical that the input-to-output delay of a dual modulus prescaler be invariant with respect to the state and history of timing fluctuations of the modulus control circuitry and Modulus_Select control input.

Importantly, if the design of a dual modulus prescaler is not carefully designed to minimize or eliminate the input-to-output delay dependence on the modulus control signal state or history, the DSM noise floor is raised which may have a significant degradation on the overall phase noise of the PLL. It is desirable in many applications, and especially in radio frequency (RF) based applications, that the noise levels of a PLL be low. In particular, it is desirable to reduce phase noise, a well-known characteristic of oscillator-based circuits.

Aspects of the present invention include design techniques for multi-modulus pre-scaler circuits that minimize the input-to-output delay dependence on the modulus control state or history. More particularly, using these design techniques, the feed-forward signal path inside a multi-modulus prescaler is identified, as well as all feedback paths connected to the feed-forward signal path. Some identified feedback paths are susceptible to capacitive load variations or signal coupling due to the modulus control circuitry and Modulus_Select control signal, and need to be isolated from the feed-forward path. The inventive techniques may be applied to multi-modulus prescaler circuits in general, and to dual modulus prescaler circuits in particular.

In various embodiments, one or more of three techniques may be applied to reduce capacitive load variations and signal coupling due to the modulus control circuitry and Modulus_Select control signal. First, for D-type flip flops coupled to critical feedback paths, separate but parallel buffered feed-forward and feedback paths may be created to increase isolation. Second, for a differential-to-single-ended converter at the prescaler output, separate but parallel feed-forward and feedback paths may be created for further isolation. (More generally, for at least one component coupled to the feed-forward signal path and having a feedback path, a buffered feedback path may be created separate but parallel to a buffered feed-forward signal path.) Third, some of the feedback paths directly coupled to the feed-forward path may be double buffered so that the forward signal path is not affected by load variations in such feedback paths.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION OF THE INVENTION

Figure 1:
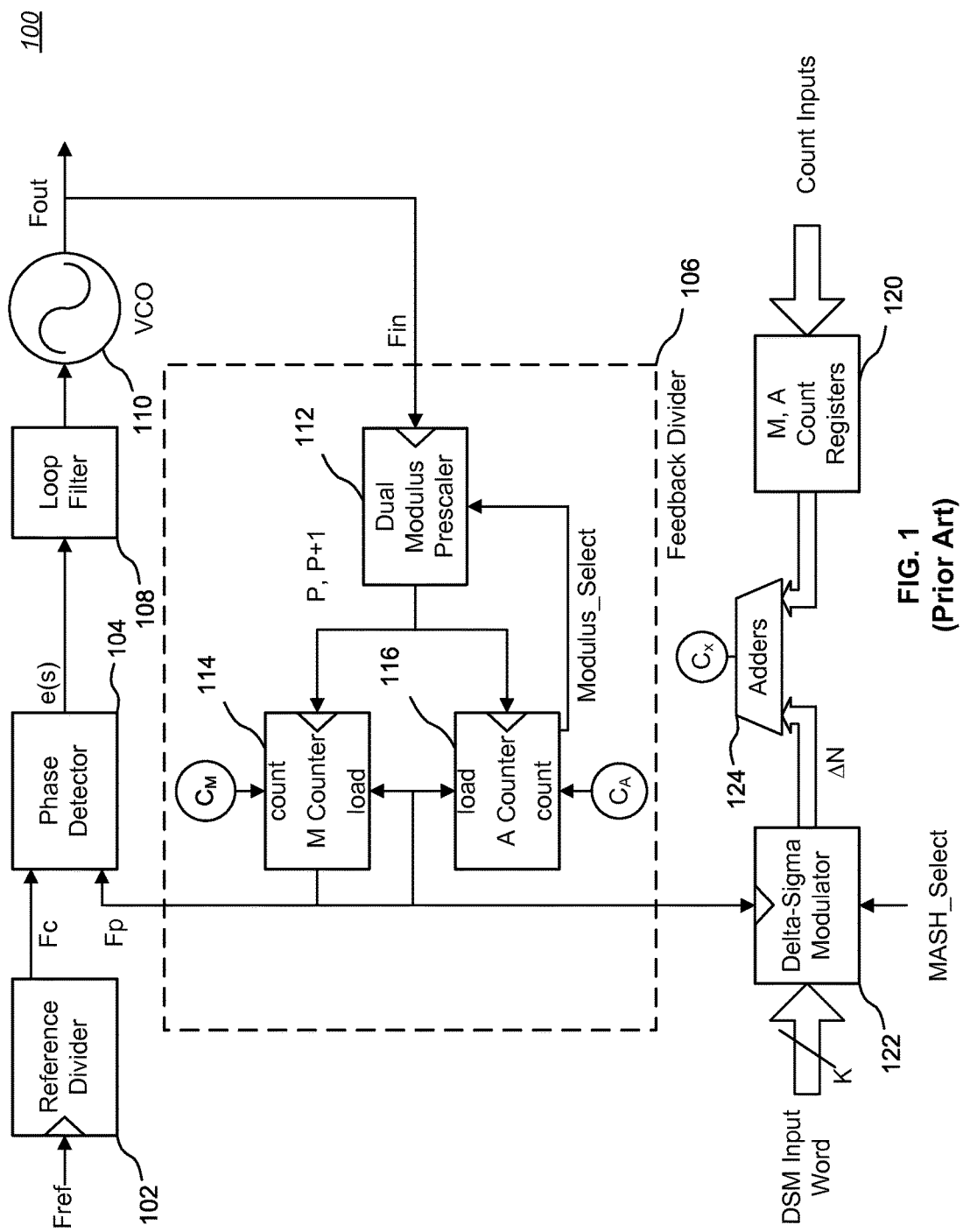
FIG. 1 is a block diagram of a prior art fractional-N phase locked loop system.

FIG. 1 is a block diagram of a prior art fractional-N phase locked loop system 100. A reference frequency, Fref, usually derived from a very stable high frequency source such as a crystal oscillator, is input to a reference divider 102. The reference divider 102 divides the high frequency Fref input down to a more manageable comparison frequency Fc. For example, a 10 MHz crystal oscillator Fref source may be divided down by a factor of 50 to obtain a 200 kHz comparison frequency Fc. By using larger division factors (e.g., 1,000), a finer comparison frequency Fc is achievable (e.g., 10 Hz).

The comparison frequency Fc is applied as one input to a phase detector 104 (typically composed of a phase frequency detector and a charge pump). The other input to the phase detector 104 is a pulse count frequency Fp from a feedback divider 106, described in greater detail below. The phase detector 104 compares the Fc, Fp signals and outputs an error signal e(s).

The error signal e(s) from the phase detector 104 is applied to a loop filter 108 that is typically implemented as a low pass filter in order to suppress spur signals and other noise. The output of the loop filter 108 is applied to a voltage controlled oscillator (VCO) 110 which oscillates at an frequency of Fout. The output frequency Fout is fed through the feedback divider 106 that generates the a pulse count frequency Fp, which is coupled back to the input of the phase detector 104, producing a negative feedback loop. If the output frequency Fout drifts, the phase error signal e(s) will increase (negative or positive), driving the output frequency Fout in the opposite direction so as to reduce the error. When Fc and Fp are equal in phase, the error will be constant and the PLL is said to be in a "locked" condition. The negative feedback loop thus forces the error signal e(s) to approach zero, at which point the feedback divider output Fp and the comparison frequency Fc (and hence the reference frequency Fref) are in phase lock.

The feedback divider 106 is essentially a 1/N divider (also known as an "N counter") that receives the output frequency Fout from the VCO 110 as an input signal Fin and generates the pulse count frequency Fp=Fout/N, where N is a programmable value that sets the relationship between the input and output frequencies in the PLL. In simple PLL designs, N is an integer; in more modern PLL designs, N may be a fractional number. Fractional N feedback dividers allow a PLL to operate with a higher reference frequency Fref while realizing a fine step size by periodically modulating the division ratio of the feedback divider 106 (for example, between N and N+1) such that the average value of Fp contains a fractional element.

Because the output Fout of the VCO 110 may be a fairly high frequency (e.g., 900 MHz), it is common to use a fixed counter element (i.e., a prescaler) within the feedback divider 106 to reduce the input frequency to a more manageable rate that the phase detector 104 can process. For example, assume that a 900 MHz output Fout is required with 10 Hz spacing in an integer-N PLL embodiment. A 10 MHz reference frequency Fref might be used, with the reference divider 102 set at 1,000. Then, the N-value for the feedback divider 106 would need to be of the order of 90,000. At first blush, this would mean at least a 17-bit programmable counter capable of dealing with an input frequency Fin of 900 MHz. In the alternative, to handle such frequencies, it makes sense to precede a programmable counter with a fixed counter element (i.e., a pre-scaler) to bring the very high input frequency down to a range at which standard counters more readily operate (use of a prescaler applies to both integer and fractional PLLs). However, using a single-modulus prescaler reduces the system resolution. This issue can be addressed by using a dual modulus prescaler 112, which is a counter whose division ratio is selected from one of two values (P or P+1) by application of an external control signal, Modulus_Select. For example, the values for P and P+1 may be 5 and 6, or 10 and 11, or selectable between the two number pairs (i.e., 5/6 or 10/11). Other values for P and P+1 may also be used. A dual modulus prescaler 112 has the advantages of a standard prescaler but without loss of resolution.

The output (P or P+1) of the dual modulus prescaler 112 is coupled to the clock inputs of two programmable counters, a Master (M) counter 114 and an Auxiliary (A) counter 116. The M counter 114 may be loaded with a count value CM, while the A counter 116 may be loaded with a count value CA, where the value of CA is constrained to be less than CM. Both counters will decrement towards zero each time the dual modulus prescaler 112 outputs a signal pulse, which indicates that either P or P+1 frequency cycles of Fout have occurred. When the A counter 116 counts down to zero, its output serves as a Modulus_Select signal to the dual modulus prescaler 112, thereby toggling the modulus of the dual modulus prescaler 112 (i.e., from P to P+1, or from P+1 to P). When the M counter 114 counts down to zero, its output Fp causes both counters to be reloaded with respective values $C_A$ and $C_M$. Depending on the values of $C_M$ and $C_A$, the A counter 116 may count down and thus toggle the modulus of the dual modulus prescaler 112 multiple times before the M counter 114 counts down to zero.

In the illustrated embodiment, the $C_A$ and $C_M$ count values are determined by adding initial externally settable base count inputs (shown stored in respective M, A count registers 120) to the output ΔN of a delta-sigma modulator (DSM) 122 by means of a set of adders 124. Essentially, ΔN is a pseudo-random offset number designed to cause the counts $C_M$, $C_A$ output by the adders 124 to vary the division ratio of the feedback divider 106 such that the average of the output Fp contains a fractional element. In some embodiments, the M, A count registers 120 and the adders 124 may be situated within the DSM 122.

In the illustrated embodiment, a conventional DSM 122 is clocked by the output Fp of the M counter 114. A DSM input control word K determines the fractional value of N by the relation $K/2^L$ for an L-bit wide DSM input control word. Internally, a multi-stage noise shaping (MASH) circuit architecture allows pseudo-random sequencing of several frequencies. In the illustrated embodiment, the MASH circuit architecture of the DSM allows for two modes, either one of which is selectable in response to an externally supplied control signal, MASH_Select. For the illustrated embodiment, a second order fractional dithering MASH mode (MASH 1-1) can output $2^2$ ΔN values (−1, 0, +1, +2), while a third order fractional dithering MASH mode (MASH 1-1-1) can output $2^3$ ΔN values (−3, −2 . . . +3, +4). In the illustrated embodiment, ΔN is represented as a 2's complement number, and thus may represent a positive, zero, or negative value. Note that while the illustrated embodiment describes use of a DSM to provide dithered values for ΔN (and hence for N), other circuits are known that can provide similar functionality with different design tradeoffs.

The value of ΔN from the DSM 122 can thus vary from cycle to cycle in a somewhat random fashion, the cycles being determined by the generation of Fp by the M counter 114. By summing ΔN with the base M and A values set in the M, A count registers 120, the $C_M$ and $C_A$ count values are modulated from cycle to cycle. Accordingly, for each cycle, the feedback divider 106 always counts to N, but N itself varies from cycle to cycle, allowing the feedback divider 106 to behave as a fractional N counter over time. For example, for a ⅚ prescaler, N=5*($C_M$+1)+$C_A$, and for a 10/11 prescaler, N=10*($C_M$+1)+$C_A$, where $C_M$ and $C_A$ may change each time Fp is generated.

Figure 2:
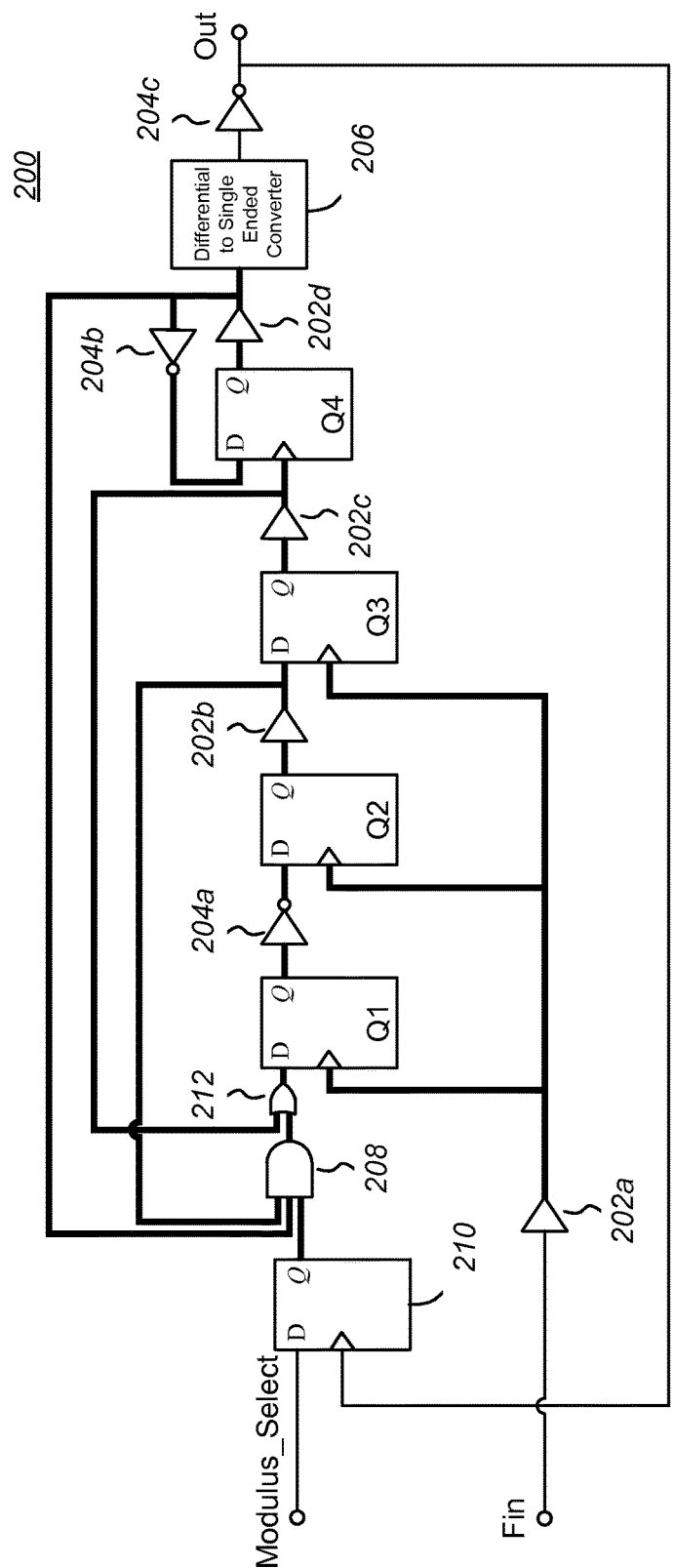
FIG. 2 is a block diagram of a prior art dual modulus prescaler.

FIG. 2 is a block diagram of a prior art dual modulus prescaler 200. The illustrated embodiment is for a 10/11 prescaler, the count value (P or P+1) of which is selectable by the Modulus_Select input signal (from FIG. 1). In this embodiment, an Fin signal (such as the Fout/Fin signal from the VCO 110 in FIG. 1) is applied to a buffer 202, the output of which is coupled to the clock input of three cascaded D-type flip-flops Q1-Q3. In this embodiment, the buffer 202 converts Fin from a single-ended signal to a differential (2 wire) signal, indicated throughout FIG. 2 by extra-thick connection lines. As shown, the output of Q1 is coupled to the input of Q2 through an inverter 204a (i.e., an inverting buffer), and the output of Q2 is coupled to the input of Q3 through a buffer 202b. The output of Q3 is applied to a buffer 202c, the output of which is used to clock a fourth flip-flop, Q4.

Flip-flop Q4 is configured, through the feedback signal provided by a buffer 202d and an inverter 204b, to change between a "0" and a "1" (i.e., toggle) when the output of Q3 changes state from a "0" to a "1". In the illustrated embodiment, the buffered output of Q4 is provided to a differential-to-single-ended converter (DSC) 206, the output of which is applied to an inverter 204c which outputs a final pre-scaled count of P or P+1 to other circuits (see FIG. 1). Differential-to-single-ended converters are well known in the art. Note that differential signaling generally has better noise performance than single-ended signaling, but prescalers can also be designed with only single-ended signaling, in which case the DSC 206 is not needed.

While the basic counter circuitry comprises the four D-type flip-flops Q1-Q4, there are a number of feedback paths in the illustrated prescaler 200 circuit that are necessary to reset the circuit when a final selected count (e.g., 10 or 11) has been reached, and to respond to a change in the Modulus_Select signal by changing the count cycle between P and P+1. In the illustrated embodiment, there are feedback paths from buffers 202b and 202d to an AND gate 208, which is also coupled to a D-type flip-flop 210 that latches in the state of the Modulus_Select signal when clocked by yet another feedback path from buffer 204c. If the Modulus_Select signal is latched in as a "0", the AND gate 208 does not pass any feedback from buffers 202b or 202d (i.e., the output of AND gate 208 is held to "0"); conversely, if the Modulus_Select signal is latched in as a "1", the AND gate 208 enables feedback from buffers 202b and 202d to control the output state the AND gate 208. The output of the AND gate 208 is coupled through an OR gate 212 to the input of Q1, along with a feedback signal from Q3.

As noted above, in a dual modulus prescaler 112, the prescaler divides the input frequency Fin by P or P+1 (e.g., 5 or 6, or 10 or 11), depending on the Modulus_Select control signal that selects the divisor. Also as noted, a dual modulus prescaler 112 functions within a PLL by working in conjunction with lower speed digital counters to achieve a total frequency division N, where N has a minimum step of one. In a MASH 1-1-1 third order DSM based fractional-N PLL, the value of N can vary from cycle to cycle from N−3 to N+4 in a somewhat random fashion. During the division process, the Modulus_Select control input to the dual modulus prescaler 112 also toggles somewhat randomly.

We have discovered that the modulus control logic in a dual modulus prescaler causes signal delay variations in the critical forward signal path. We have also found that it is critical that the input-to-output delay of a dual modulus prescaler be invariant with respect to the state and history of timing fluctuations of the modulus control circuitry and Modulus_Select control input.

Importantly, if the design of a dual modulus prescaler 112 is not carefully designed to minimize or eliminate the input-to-output delay dependence on the modulus control signal state or history, the DSM noise floor is raised which may have a significant degradation on the overall phase noise of the PLL. It is desirable in many applications, and especially in radio frequency (RF) based applications, that the noise levels of a PLL be low. In particular, it is desirable to reduce phase noise, a well-known characteristic of oscillator-based circuits. One definition of phase noise is the ratio of the noise in a 1 Hz bandwidth at a specified frequency offset, fm, to the oscillator signal amplitude at frequency fo. Spectral purity of the output of a PLL is specified in part by the phase noise.

Aspects of the present invention include design techniques for multi-modulus pre-scaler circuits that minimize the input-to-output delay dependence on the modulus control state or history. More particularly, using these design techniques, the feed-forward signal path inside a multi-modulus prescaler is identified, as well as all feedback paths connected to the feed-forward signal path. Some identified feedback paths are susceptible to capacitive load variations or signal coupling due to the modulus control circuitry and Modulus_Select control signal, and need to be isolated from the feed-forward path. The inventive techniques may be applied to multi-modulus prescaler circuits in general, and to dual modulus prescaler circuits in particular, including prescaler circuits with selectable values for P and P+1.

In various embodiments, one or more of three techniques may be applied to reduce capacitive load variations and signal coupling due to the modulus control circuitry and Modulus_Select control signal. First, for D-type flip flops coupled to critical feedback paths, separate but parallel buffered feed-forward and feedback paths may be created to increase isolation. Second, for the prescaler output, separate but parallel feed-forward and feedback paths may be created for further isolation. (Note that the first and second techniques are variants of a more general technique: for at least one component coupled to the feed-forward signal path and having a feedback path, a buffered feedback path may be created separate but parallel to a buffered feed-forward signal path). Third, some of the feedback paths directly coupled to the feed-forward path may be double buffered so that the forward signal path is not affected by load variations in such feedback paths.

Figure 3:
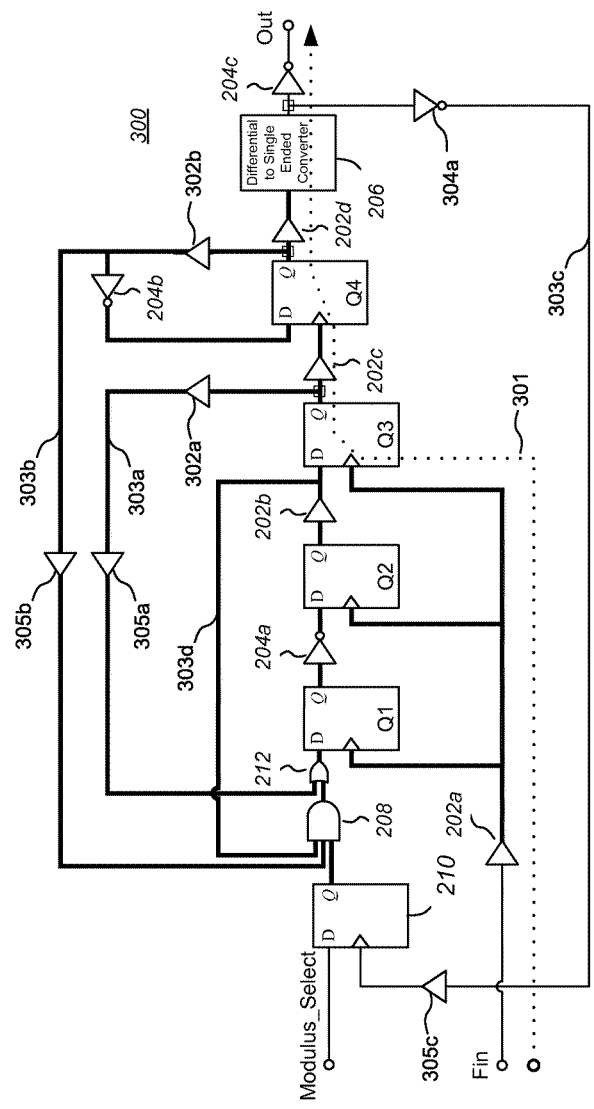
FIG. 3 is a block diagram of a dual modulus prescaler embodiment in accordance with the present invention.

FIG. 3 is a block diagram of a dual modulus prescaler embodiment 300 in accordance with the present invention. A dotted line indicates the critical feed-foreword path 301 for the illustrated embodiment. As shown in FIG. 2, the feedback paths from Q3 and Q4 along the critical feed-foreword path are conventionally single buffered, and each buffer output is coupled to both the feed-forward path and a respective feedback path. However, in the embodiment illustrated in FIG. 3, applying the first technique described above, separate but parallel feed-forward and feedback paths for Q3 and Q4 have been created at the junctures shown by open square symbols on the output paths for Q3 and Q4, respectively. Thus, buffer 202c couples the output of Q3 to the clock input of Q4, and a separate but parallel buffer 302a connects the output of Q3 to the feedback path 303a for Q3. Similarly, buffer 202d couples the output of Q4 to the DSC 206, and a separate but parallel buffer 302b connects the output of Q3 to the feedback path 303b for Q4.

Similarly, as shown in FIG. 2, the feedback path from the output along the critical feed-foreword path is conventionally single buffered by means of an inverter, and the inverter output is coupled to both the feed-forward path and a feedback path. However, in the embodiment illustrated in FIG. 3, applying the second technique described above, separate but parallel feed-forward and feedback paths for the output have been created at the juncture shown by an open square symbol on the output path (in this case, after the DSC 206). Thus, inverter 204*c* couples the output of the prescaler embodiment 300 to external circuitry (not shown), while a separate but parallel feedback inverter 304*a* connects the output to the feedback path 303*c*. As noted above, differential signaling generally has better noise performance than single-ended signaling, and so is depicted in the embodiment illustrated in FIG. 3; however, prescalers can also be designed with only single-ended signaling, in which case the DSC 206 is not needed. In such a case, buffer 202*d* (or an inverter, depending on the logic states needed by coupled circuitry) will serve as the output of the prescaler embodiment 300, and the parallel feedback inverter 304*a* (or a buffer, depending on whether the point of connection is a buffer or an inverter) can be coupled to such output or to the output of Q4.

Finally, applying the third technique described above, one or more of the added buffers 302*a*, 302*b* and/or the added inverter 304*a* in the now-separate feedback paths 303*a*-303*c* may be augmented by inserting an additional corresponding buffer 305*a*-305*c* (or, in appropriate cases, an inverter) so that the corresponding feedback paths 303*a*-303*c* are "double buffered", thereby further increasing the isolation of the feed-forward path 301 from the feedback paths 303*a*-303*c*. In some embodiments, the added buffers 305*a*-305*c* may be implemented as source follower circuits.

Note that the feedback path 303*d* from Q2 to AND gate 208 is not directly coupled to the feed-forward path 301, and so need not be split into separate paths or double-buffered. However, in some embodiments, a buffer or double buffer or other circuitry may be added, for example, as level-shifters. Note also that buffers and inverters (which are inverting buffers, as noted above) may be interchanged as needed if the inputs and/or outputs of connected circuitry are changed to opposite signal polarities than shown in the embodiment of FIG. 3.

The circuit changes shown in FIG. 3 significantly improve the prescaler input-to-output delay invariance to the modulus control input state and historical pattern, which has the effect of improving the overall DSM fractional-N PLL phase noise performance. For example, in one simulation of a dual modulus circuit similar to that shown in FIG. 2 but in a 5/6 configuration, the peak-to-peak signal delay variation at 4 GHz was about 10 ps, while for a 10/11 configuration, the signal delay variation was about 30 ps. After applying all three design techniques to a dual modulus circuit similar to that shown in FIG. 3 but in a 5/6 configuration, the peak-to-peak signal delay variation at 4 GHz was about 0.6 ps, while for a 10/11 configuration, the signal delay variation was about 0.4 ps. The following table summarizes these comparative results:

| Peak to Peak Signal Delay Variation at 4 GHz for Example Simulated Dual Modulus Prescaler Circuits | | |
|---|---|---|
| Configuration | Conventional Design | New Design |
| 5/6 | 10 ps | 0.6 ps |
| 10/11 | 30 ps | 0.4 ps |

The remedial contributions of each technique described above may not be symmetric. For example, in simulations of particular embodiments, applying only the second and third techniques (i.e., creating separate but parallel feed-forward and feedback paths for the DSC 206 and double buffering the associated feedback path 303*c*) was found to significantly improve the signal delay variation (over 70% in one simplified simulation), as did applying only the first and third techniques (i.e., creating separate but parallel feed-forward and feedback paths the D-type flip-flops along the feed-forward path 301 and double buffering the associated feedback paths 303*a*, 303*b*). Accordingly, in particular designs, some but not all of the techniques described above may be applied to meet particular design parameters and specifications.

Another aspect of the invention includes a method for reducing the phase noise of a multi-modulus prescaler electronic circuit, including: identifying a feed-forward signal path for the multi-modulus prescaler electronic circuit; identifying each component coupled to the feed-forward signal path and having a feedback path within the multi-modulus prescaler electronic circuit; and for at least one such identified component, creating a buffered feedback path separate but parallel to a buffered feed-forward signal path.

Yet another aspect of the invention includes a method for reducing the phase noise of a multi-modulus prescaler electronic circuit having a feed-forward signal path, at least one D-type flip-flop coupled to the feed-forward signal path and having a corresponding feedback path, and a differential-to-single ended converter coupled to the feed-forward signal path and having a corresponding feedback path, including: for each of the at least one D-type flip-flop, creating a buffered feedback path separate but parallel to a buffered feed-forward signal path; and, for the differential-to-single ended converter, creating a buffered feedback path separate but parallel to a buffered feed-forward signal path.

Another aspect of the above methods includes double-buffering at least one created buffered feedback path.

A number of embodiments of the invention have been described. It is to be understood that various modifications may be made without departing from the spirit and scope of the invention. For example, some of the steps described above may be order independent, and thus can be performed in an order different from that described. Various activities described with respect to the methods identified above can be executed in repetitive, serial, or parallel fashion. It is to be understood that the foregoing description is intended to illustrate and not to limit the scope of the invention, which is defined by the scope of the following claims, and that other embodiments are within the scope of the claims.

What is clamed is:

1. A method for reducing phase noise in a multi-modulus prescaler electronic circuit, including:
   (a) providing a feed-forward signal path for the multi-modulus prescaler electronic circuit;
   (b) providing at least one feedback path within the multi-modulus prescaler electronic circuit; and
   (c) buffering each feedback path and the feed-forward path such that the feed-forward signal path and each feedback path serve as a separate but parallel buffered feed-forward signal path and feedback paths.

2. The method of claim 1, further including double-buffering at least one buffered feedback path.

3. The method of claim 1, wherein the multi-modulus prescaler electronic circuit is a dual modulus prescaler electronic circuit.

4. A method for reducing phase noise in multi-modulus prescaler electronic circuit having a feed-forward signal path, the feed-forward signal path having at least one flip-flop and having a differential-to-single ended converter the multi-modulus prescaler electronic circuit further having first feedback path from an output of the differential-to-single ended converter, including:
(a) for each of the at least one flip-flop, providing a buffered second feedback path separate but parallel to a buffered feed-forward signal path; and
(b) for providing from the differential-to-single ended converter, a buffered second feedback path separate but parallel to a buffered feed-forward signal path.

5. The method of claim 4, further including double-buffering at least one of the first and second feedback paths.

6. The method of claim 4, wherein the multi-modulus prescaler electronic circuit is a dual modulus prescaler electronic circuit.

7. A method for reducing phase noise in dual modulus prescaler electronic circuit having a feed-forward signal path, the feed-forward signal path having at least one flip-flop and having a differential-to-single ended converter the multi-modulus prescaler electronic circuit further having first feedback path from an output of the differential-to-single ended converter, including:
(a) for each of the at least one flip-flop, providing a double-buffered second feedback path separate but parallel to a buffered feed-forward signal path; and
(b) for providing from the differential-to-single ended converter, a double-buffered second feedback path separate but parallel to a buffered feed-forward signal path.

8. A multi-modulus prescaler electronic circuit having a feed-forward signal path, including at least one component coupled to the feed-forward signal path and having a feedback path within the multi-modulus prescaler, wherein each such component has a buffered feedback path separate but parallel to a buffered feed-forward signal path.

9. The multi-modulus prescaler electronic circuit of claim 8, wherein the buffered feedback path of at least one such component is double-buffered.

10. The multi-modulus prescaler electronic circuit of claim 8, wherein the multi-modulus prescaler electronic circuit is a dual modulus prescaler electronic circuit.

11. The multi-modulus prescaler electronic circuit of claim 8, wherein at least one such component is a D-type flip-flop.

12. The multi-modulus prescaler electronic circuit of claim 8, wherein at least one such component is a differential-to-single ended converter.

13. A multi-modulus prescaler electronic circuit including:
(a) a feed-forward signal path within the multi-modulus prescaler electronic circuit;
(b) at least one D-type flip-flop coupled to the feed-forward signal path and having a buffered first feedback path separate but parallel to a buffered feed-forward signal path; and
(c) a differential-to-single ended converter coupled to the feed-forward signal path and having a buffered second feedback path separate but parallel to a buffered feed-forward signal path.

14. The multi-modulus prescaler electronic circuit of claim 13, wherein at least one buffered first and second feedback path is double-buffered.

15. The multi-modulus prescaler electronic circuit of claim 13, wherein the multi-modulus prescaler electronic circuit is a dual modulus prescaler electronic circuit.

16. A dual modulus prescaler electronic circuit including:
(a) a feed-forward signal path within the dual-modulus prescaler electronic circuit;
(b) at least one D-type flip-flop coupled to the feed-forward signal path, each having a double buffered feedback path separate but parallel to a corresponding buffered feed-forward signal path comprising part of the feed-forward signal path; and
a differential-to-single ended converter coupled to the feed-forward signal path and having a double buffered feedback path separate but parallel to a corresponding buffered feed-forward signal path comprising part of the feed-forward signal path.

17. A method for reducing phase noise in multi-modulus prescaler electronic circuit, including:
(a) providing a feed-forward signal path for the multi-modulus prescaler electronic circuit including a first feed-forward flip-flop for capturing the state of a signal at a data input of the first feed-forward flip-flop upon a transition of a signal applied to a clock input of the first feed-forward flip-flop, the clock input of the first feed-forward flip-flop coupled to the output of a first feed-forward buffer, the first feed-forward flip-flop further having an output coupled to a second feed-forward buffer, a second feed-forward flip-flop having a clock input coupled through the second feed-forward buffer to the output of the first feed-forward flip-flop, the second feed-forward flip-flop further having an output coupled to a third feed-forward buffer;
(b) providing a feedback path within the multi-modulus prescaler electronic circuit, the feedback path including a reset circuit having four inputs and an output, a first feedback buffer coupled to the output of the second feed-forward flip-flop, a second feedback buffer coupled to the output of the first feedback buffer, output of the second feedback buffer coupled to the data input of the second feed-forward flip-flop, a third feedback buffer coupled to the output of the first feedback buffer, the output of the third buffer coupled to a first input of the reset circuit, the output of the reset circuit coupled a fourth feedback buffer, the output of the fourth feedback buffer coupled to the data input of the first feed-forward flip-flop and to the second input of the reset circuit, a fifth feedback buffer having an input coupled to the output of the reset circuit, the output of the fifth feedback buffer coupled to a third input to the reset circuit;
(c) providing a modulus select flip-flop having a data input configured to receive a modulus select signal, the modulus select flip-flop further having a clock input and an output, the output coupled to the fourth input to the reset circuit;
(d) providing a first modulus select buffer having an input coupled to the output of the second feed-forward buffer, a second modulus select buffer having an input coupled to an output of the first modulus select buffer and to an output coupled to the clock input of the modulus select flip-flop; and
(e) setting the logic state at the input of the first feed-forward flip-flop through the reset circuit.

* * * * *